United States Patent [19]

Udagawa

[11] Patent Number: 5,120,078
[45] Date of Patent: Jun. 9, 1992

[54] STEEL LAMINATE GASKET WITH ENGINE BLOCK PROTECTING DEVICE

[75] Inventor: Tsunekazu Udagawa, Ichikawa, Japan

[73] Assignee: Ishikawa Gasket Co., Ltd., Tokyo, Japan

[21] Appl. No.: 366,190

[22] Filed: Jun. 15, 1989

[30] Foreign Application Priority Data

Jun. 17, 1988 [JP] Japan .................. 63-80486[U]

[51] Int. Cl.⁵ .................................................. F16J 15/08
[52] U.S. Cl. ................................... 277/235 B; 277/180
[58] Field of Search .......... 277/232, 233, 234, 235 B, 277/236, 180

[56] References Cited

U.S. PATENT DOCUMENTS

| | | | |
|---|---|---|---|
| 1,815,602 | 7/1931 | Russell | 277/235 B |
| 1,843,297 | 2/1932 | Oven | 277/235 B |
| 3,330,568 | 7/1967 | Wetzel | 277/236 X |
| 3,817,540 | 6/1974 | Nicholson | 277/180 X |
| 3,917,294 | 11/1975 | Abbes et al. | 277/180 |
| 4,714,260 | 12/1987 | Udagawa | 277/236 X |
| 4,739,999 | 4/1988 | Ishii et al. | 277/36 X |
| 4,759,585 | 7/1988 | Udagawa | 277/236 X |
| 4,767,124 | 8/1988 | Udagawa | 277/236 X |
| 4,776,601 | 10/1988 | Yamada | 277/235 B X |
| 4,807,892 | 2/1989 | Udagawa | 277/236 X |

FOREIGN PATENT DOCUMENTS 2019477 11/1971 Fed. Rep. of Germany ... 277/235 B

Primary Examiner—William A. Cuchlinski, Jr.
Assistant Examiner—Scott W. Cummings
Attorney, Agent, or Firm—Kanesaka and Takeuchi

[57] ABSTRACT

A steel laminate gasket of the invention is installed in an internal combustion engine having at least one hole to be sealed. The gasket comprises first and second plates, at least one middle plate situated between the first and second plates, and a cover member situated outside the hole of the engine to surround the same. A ring member is situated adjacent to the cover member. At least one protecting plate is placed over the ring member and at least a part of the middle plate. The protecting plate is made of a material harder than the ring member. Therefore, when the gasket is tightened, the gasket and the engine blocks do not deform, and wide and strong sealing pressure is obtained.

8 Claims, 2 Drawing Sheets

STEEL LAMINATE GASKET WITH ENGINE BLOCK PROTECTING DEVICE

BACKGROUND OF THE INVENTION AND RELATED ART STATEMENT

The present invention relates to a steel laminate gasket for an internal combustion engine with an engine block protecting device.

In an internal combustion engine, a gasket is installed between two engine blocks for sealing around cylinder holes, water holes, oil holes and so on. Recently, an engine has been developed to provide high power with light weight. For this purpose, an engine size is getting smaller, and a cylinder head is made of an aluminum alloy.

A steel laminate gasket formed of a plurality of steel plates is strong and can securely seal around holes where high pressure is applied. Therefore, a steel laminate gasket has been used for an engine with high power and light weight.

In a steel laminate gasket, in case an area around a hole where high pressure is applied, such as a cylinder hole, is tightly sealed, a wire ring may be incorporated in the steel laminate gasket. A steel laminate gasket 10 with a wire ring 11 is shown in FIG. 1.

The gasket 10 as shown in FIG. 1 is formed of an upper plate 12 with a curved portion 12a and a flange 12b, a lower plate 15, and two inner plates 13, 14. The wire ring 11 is situated adjacent to the curved portion 12a.

In case the gasket 10 is installed between a cylinder head X made of an aluminum alloy and a cylinder block Y made of iron, and is strongly tightened, the cylinder head X as well as the wire ring 11 slightly dent or deform.

While an engine is operating, the engine is slightly vibrating. Therefore, once a cylinder head slightly deforms, the gasket can not seal completely around a hole.

Further, in case a cylinder head deforms, if a cylinder head is removed from a cylinder block, the cylinder head can not be used any more. Even if a new gasket is installed between the cylinder head and cylinder block, complete sealing between the cylinder head and cylinder block can not be made because of the dent of the cylinder head. In order to use the deformed cylinder head, it is required to make the deformed cylinder head flat by cutting the same.

Therefore, an object of the present invention is to provide a steel laminate gasket, which can be tightened strongly without causing damages to the engine blocks.

Another object of the invention is to provide a steel laminate gasket as stated above, wherein an even surface pressure can be applied around a hole to be sealed.

A further object of the invention is to provide a steel laminate gasket as stated above, which can be manufactured easily and economically.

Further objects and advantages of the invention will be apparent from the following description of the invention.

SUMMARY OF THE INVENTION

A steel laminate gasket of the invention is installed in an internal combustion engine having at least one hole to be sealed. The gasket comprises a first plate, a second plate and at least one middle plate situated between the first and second plates.

The gasket is further provided with a cover member situated outside the hole of the engine and engaging the first and second plates, and a ring member situated outside the cover member relative to the hole. At least one protecting plate is situated over the ring member and at least a part of the middle plate, i.e. between the ring member and the cover member where tightening pressure is applied.

The protecting plate is made of a material harder than that of the ring member. Therefore, when the gasket is tightened, a portion of the gasket corresponding to the ring member does not project outwardly. Tightening pressure is applied evenly on the protecting plate.

The protecting plate may be formed in the shape of an annulus. When a plurality of protecting plates is installed for the respective cylinder holes, the protecting plates may be integrally connected together.

The cover member includes a curved portion and at least one flange. The cover member may be integrally connected to the first plate. Instead, the cover member may be a grommet.

DETAILED DESCRIPTION OF PREFERRED EMBODIMENTS

Figure 1:
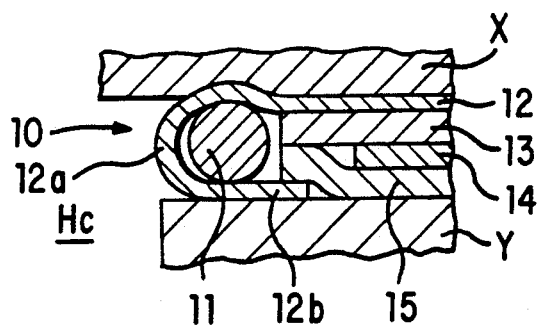
FIG. 1 is a cross section view of a conventional steel laminate gasket with a wire ring, wherein the gasket situated between a cylinder head and a cylinder block is tightened.
Figure 2:
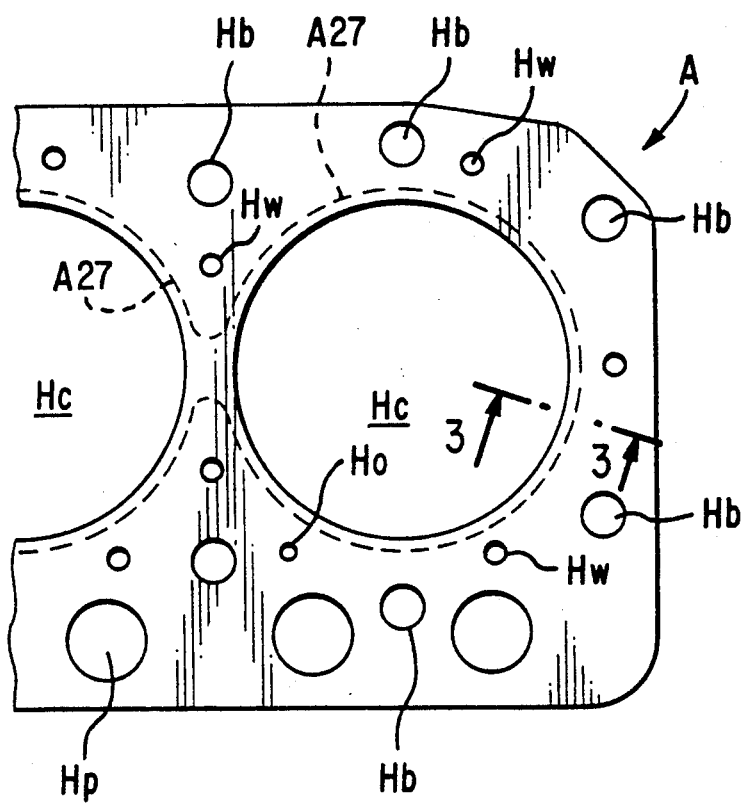
FIG. 2 is a plan view of a part of a first embodiment of a steel laminate, gasket of the present invention.
Figure 3:
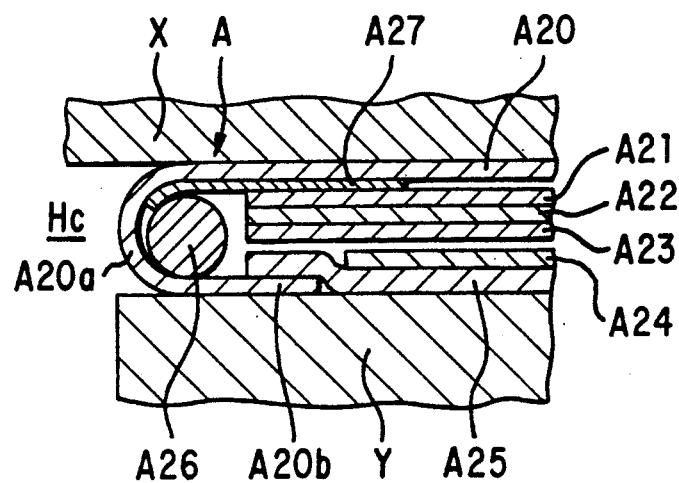
FIG. 3 is an enlarged cross section view taken along a line 3—3 in FIG. 2, wherein the gasket is situated between the cylinder head and cylinder block.

Referring to FIGS. 2 and 3, a first embodiment A of a steel laminate gasket of the invention is shown. The gasket A is a cylinder head gasket and is provided with cylinder holes Hc, water holes Hw, oil holes Ho and push rod holes Hp, as in the conventional gasket. Sealing mechanisms around the water holes Hw, oil holes Ho and push rod holes Hp do not constitute the present invention. Therefore, the sealing mechanisms around the water holes Hw, oil holes Ho and push rod holes Hp are omitted in FIG. 1. Any kind of sealing mechanisms may be used.

As shown in FIG. 3, the gasket A comprises an upper plate A20, a lower plate A25, and middle plates A21, A22, A23, A24. The upper plate A20 includes a curved portion A20a around the cylinder hole Hc, and a flange A20b situated under a part of the lower plate A25.

A wire ring A26 made of a steel wire is installed around the cylinder hole Hc adjacent the curved portion A20a to provide high surface pressure when the gasket is tightened.

A protecting plate A27 is situated under the upper plate A20 and above the wire ring A26 and a part of the middle plate A21. The protecting plate A27 has an annular shape and is connected to the adjacent protecting plate A27, as shown in dot lines in FIG. 2.

The protecting plate A27 is made of a material harder than the wire ring A26 so that when the gasket A is tightened, the protecting plate A27 does not bend or deform.

In the gasket A, the protecting plate A27 is situated above the wire ring A26 and a part of the middle plate A21. Therefore, when the gasket A is tightened between a cylinder head X and a cylinder block Y, the surface pressure around the cylinder hole Hc is formed substantially evenly above the protecting plate A27. Wide and strong sealing pressure is obtained in the gasket A. Even if the cylinder head X is made of an aluminum alloy, the cylinder head does not deform when the gasket A is tightened.

In this respect, if a gasket without the protecting plate A27 is tightened strongly, the cylinder head X may deform as well as the upper plate. Consequently, sealing between the cylinder head X and cylinder block Y can not be securely made.

In the gasket A, the protecting plate A27 is shaped into an annular form and is connected to the adjacent protecting plate. Therefore, in the gasket A, the protecting plate A27 can be easily assembled with other plates. Further, sealing ability and mechanical strength between the adjacent cylinder holes can be improved.

Figure 4:
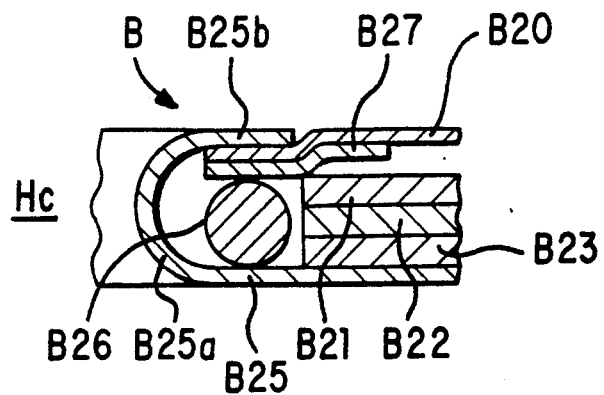
FIGS. 4–6 are cross section views, similar to FIG. 3, of second to fourth embodiments of a steel laminate gasket of the invention.

FIG. 4 shows a second embodiment B of a steel laminate gasket of the invention. The gasket B comprises an upper plate B20, middle plates B21, B22, B23, a lower plate B25, a wire ring B26, and a protecting plate B27, similar to the gasket A. In the gasket B, the lower plate B25 is provided with a curved portion B25a and a flange B25b situated above the upper plate B20. The shape of the protecting plate B27 is the same as the protecting plate A27. The gasket B operates as in the gasket A.

Figure 5:
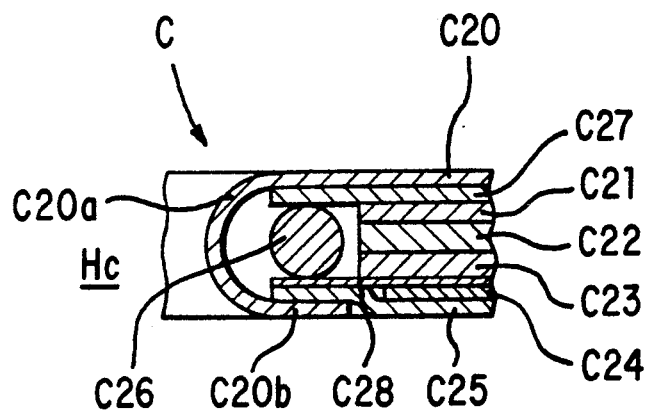

FIG. 5 shows a third embodiment C of a steel laminate gasket of the invention. The gasket C comprises an upper plate C20 with a curved portion C20a and a flange C20b, middle plates C21, C22, C23, C24, a lower plate C25 and a wire ring C26, as in the gasket A.

In the gasket C, however, protecting plates C27, C28 made of materials harder than the wire ring C26 are further provided. The plates C27, C28 are situated above and under the wire ring C26 and extend throughout the entire area of the gasket C to constitute middle plates. In the gasket C, since the wire ring C26 is covered by the protecting plates C27, C28, the cylinder head and cylinder block are protected as well.

Figure 6:
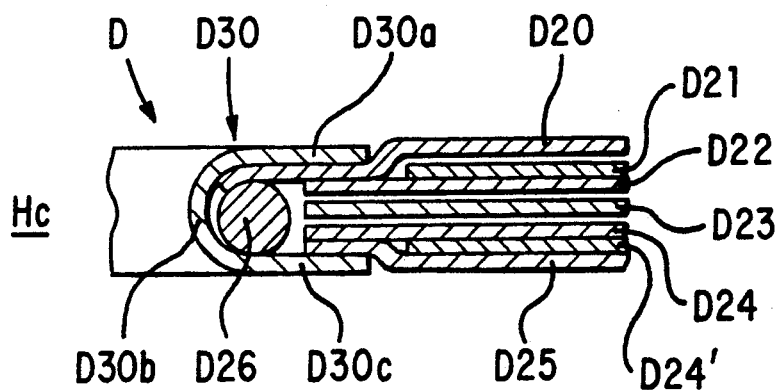

FIG. 6 shows a fourth embodiment D of a steel laminate gasket of the invention. The gasket D comprises an upper plate D20, middle plates D21, D22, D23, D24, D24', lower plate D25 and a wire ring D26, similar to the gasket A. The gasket D is further provided with a grommet D30 having an upper flange D30a, a curved portion D30b and a lower flange D30c.

In the gasket D, the upper plate D20 is made of a material harder than the wire ring D26 and extends between the upper flange D30a and the wire ring D26. The gasket D operates as in the gasket A.

In the present invention, at least one protecting plate made of a material harder than the wire ring is situated over a wire ring and at least a part of plates. Therefore, even if the gasket is strongly tightened, the gasket and engine blocks do not deform along the wire ring. Wide and high sealing pressure is obtained.

While the invention has been explained with reference to the specific embodiments of the invention, the explanation is illustrative and the invention is limited only by the appended claims.

What is claimed is:

1. A steel laminate gasket for an internal combustion engine having at least one hole to be sealed, comprising:
    a first plate including at least one first hole having a size equal to or greater than that corresponding to the hole of the entire,
    a second plate situated under the first plate and including at least one second hole having a size equal to or greater than that corresponding to the hole of the engine,
    at least one middle plate situated between the first and second plates and having at least one third hole greater than the hole of the engine
    a cover member situated outside the hole of the engine to surround the same and engaging the first and second plates,
    a ring member for sealing around the hole of the engine, said ring member being situated outside the cover member relative to the hole of the engine and partly covered by the cover member, and
    at least one protecting plate situated over the ring member and at least a part of the middle plate, said protecting plate being made of a material harder than that of the ring member so that when the gasket is tightened, a portion corresponding to the ring member does not project outwardly.

2. A steel laminate gasket according to claim 1, wherein said protecting plate is in the shape of an annulus.

3. A steel laminate gasket according to claim 2, wherein a plurality of protecting plates are installed in the gasket, the protecting plates adjacent to each other being integrally connected together.

4. A steel laminate gasket according to claim 3, wherein said cover member is integrally connected to the first plate, said cover member having a curved portion extending toward the second plate and a flange situated outside a part of the second plate.

5. A steel laminate gasket according to claim 1, wherein said protecting plate extends substantially throughout the entire area of the gasket.

6. A steel laminate gasket according to claim 5, wherein said middle plate is integrally formed with the protecting plate.

7. A steel laminate gasket according to claim 6, wherein said cover member is integrally connected to the first plate, said cover member having a curved portion extending toward the second plate and a flange situated outside a part of the second plate.

8. A steel laminate gasket according to claim 5, wherein said first plate is integrally formed with the protecting plate, said cover member being a grommet having a curved portion, an upper flange situated above the first plate and a lower flange situated under the second plate.

* * * * *